(12) United States Patent
Tanaka et al.

(10) Patent No.: US 9,113,027 B2
(45) Date of Patent: Aug. 18, 2015

(54) IMAGING DEVICE, METHOD FOR CONTROLLING IMAGING DEVICE, AND STORAGE MEDIUM STORING A CONTROL PROGRAM

(71) Applicant: FUJIFILM Corporation, Tokyo (JP)

(72) Inventors: Seiji Tanaka, Saitama (JP); Kenkichi Hayashi, Saitama (JP); Tomoyuki Kawai, Saitama (JP); Hidekazu Kurahashi, Saitama (JP); Noriko Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/315,447

(22) Filed: Jun. 26, 2014

(65) Prior Publication Data

US 2014/0307136 A1 Oct. 16, 2014

Related U.S. Application Data

(63) Continuation of application No. PCT/JP2012/083975, filed on Dec. 27, 2012.

(30) Foreign Application Priority Data

Dec. 27, 2011 (JP) ................................. 2011-286691

(51) Int. Cl.
*H04N 5/335* (2011.01)
*H04N 9/04* (2006.01)
(Continued)

(52) U.S. Cl.
CPC .................. *H04N 9/045* (2013.01); *G02B 7/36* (2013.01); *G03B 13/36* (2013.01); *H04N 5/23212* (2013.01); *H04N 5/347* (2013.01)

(58) Field of Classification Search
CPC .............................. H04N 5/23212; G02B 7/36
USPC ........................................................ 348/353
See application file for complete search history.

(56) References Cited

U.S. PATENT DOCUMENTS 6,995,796 B2 2/2006 Taubman
2002/0149686 A1 10/2002 Taubman
(Continued)

FOREIGN PATENT DOCUMENTS

JP 8-23542 A 1/1996
JP 8-23543 A 1/1996
(Continued)

OTHER PUBLICATIONS

John Savard, Color Filter Array Designs, Feb. 19, 2006, Quadibloc, pp. 3 and 4.*

(Continued)

*Primary Examiner* — Christopher K Peterson
(74) *Attorney, Agent, or Firm* — Birch, Stewart, Kolasch & Birch, LLP

(57) ABSTRACT

An AF evaluation value is computed with excellent precision. An imaging apparatus (10) includes: an image pickup device (14) including plural photoelectric conversion elements arrayed in a first direction and a second direction; a color filter having repeatedly disposed basic array patterns that each include plural array lines that each run along the second direction and include in the second direction at least one of each of a first filter or second filters with the plural array lines including plural matching array lines in which the second direction positions of the first filter match each other and including at least one array line that has a different array of the first filters in the second direction to that of the matching array lines; and an image processing section (20) that reads pixel signals of the plurality of pixels at a set cycle from the image pickup device (14), and, from the read pixel signals, generates line image data of the matching array lines in the base array pattern, sums together pixels of the first color out of the generated line image data, generates pixel data based on the line image data that has been pixel summed, and computes an evaluation value for contrast AF based on the generated image data.

18 Claims, 20 Drawing Sheets

(51) Int. Cl.
*G02B 7/36* (2006.01)
*G03B 13/36* (2006.01)
*H04N 5/232* (2006.01)
*H04N 5/347* (2011.01)

(56) References Cited

U.S. PATENT DOCUMENTS

| | | |
|---|---|---|
| 2004/0109068 A1 | 6/2004 | Mitsunaga et al. |
| 2004/0169747 A1 | 9/2004 | Ono et al. |
| 2005/0068455 A1 | 3/2005 | Hatano |
| 2006/0203113 A1 | 9/2006 | Wada et al. |
| 2006/0222269 A1 | 10/2006 | Ohno |
| 2007/0153104 A1 | 7/2007 | Ellis-Monaghan et al. |
| 2007/0242147 A1 | 10/2007 | Kawai |
| 2007/0280666 A1 | 12/2007 | Nakahara |
| 2008/0151083 A1 | 6/2008 | Hains et al. |
| 2008/0309779 A1* | 12/2008 | Chiang et al. ............... 348/222.1 |
| 2009/0189232 A1 | 7/2009 | Silverstein et al. |
| 2011/0069189 A1 | 3/2011 | Venkataraman et al. |
| 2012/0025060 A1 | 2/2012 | Iwata |

FOREIGN PATENT DOCUMENTS

| | | |
|---|---|---|
| JP | 11-285012 A | 10/1999 |
| JP | 2000-308080 A | 11/2000 |
| JP | 2002-135793 A | 5/2002 |
| JP | 2004-221839 A | 8/2004 |
| JP | 2004-266369 A | 9/2004 |
| JP | 2005-107252 A | 4/2005 |
| JP | 2005-136766 A | 5/2005 |
| JP | 2005-283776 A | 10/2005 |
| JP | 2006-324760 A | 11/2006 |
| JP | 2007-184904 A | 7/2007 |
| JP | 3960965 B2 | 8/2007 |
| JP | 2007-274599 A | 10/2007 |
| JP | 2007-306490 A | 11/2007 |
| JP | 2008-15494 A | 1/2008 |
| JP | 2008-236620 A1 | 10/2008 |
| JP | 2010-512048 A | 4/2010 |
| JP | 2010-153511 A1 | 7/2010 |
| JP | 2011-523538 A | 8/2011 |
| WO | WO 02/056604 A1 | 7/2002 |
| WO | WO 2008/066698 A2 | 6/2008 |
| WO | WO 2009-151903 A2 | 12/2009 |

OTHER PUBLICATIONS

First Chinese Office Action, dated May 23, 2013, issued in Chinese Patent Application No. 201180022503.3.
International Search Report, mailed Apr. 16, 2013, issued in PCT/JP2012/083975.
Written Opinion of the International Searching Authority, mailed Apr. 16, 2013, issued in PCT/JP2012/083975.
Written Opinion of the International Searching Authority, mailed Jan. 15, 2013, issued in PCT/JP2012/080899.
Written Opinion of the International Searching Authority, mailed Jan. 15, 2013, issued in PCT/JP2012/081644.
Written Opinion of the International Searching Authority, mailed Jan. 22, 2013, issued in PCT/JP2012/080898.
Written Opinion of the International Searching Authority, mailed Jan. 29, 2013, issued in PCT/JP2012/083583.
Supplementary European Search Report of EP 12861956.6 dated Jul. 2, 2015.

* cited by examiner

FIG.3

| | A ARRAY | | | B ARRAY | |
|---|---|---|---|---|---|
| G | B | G | G | R | G |
| R | G | R | B | G | B |
| G | B | G | G | R | G |
| G | R | G | G | B | G |
| B | G | B | R | G | R |
| G | R | G | G | B | G |

FIG.4

|  | A ARRAY | | B ARRAY | | | | | |
|---|---|---|---|---|---|---|---|---|
| G | B | G | G | R | G | G | B | G |
| R | G | R | B | G | B | R | G | R |
| G | B | G | G | R | G | G | B | G |
| G | R | G | G | B | G | G | R | G |
| B | G | B | R | G | R | B | G | B |
| G | R | G | G | B | G | G | R | G |
| G | B | G | G | R | G | G | B | G |
| R | G | R | B | G | B | R | G | R |
| G | B | G | G | R | G | G | B | G |

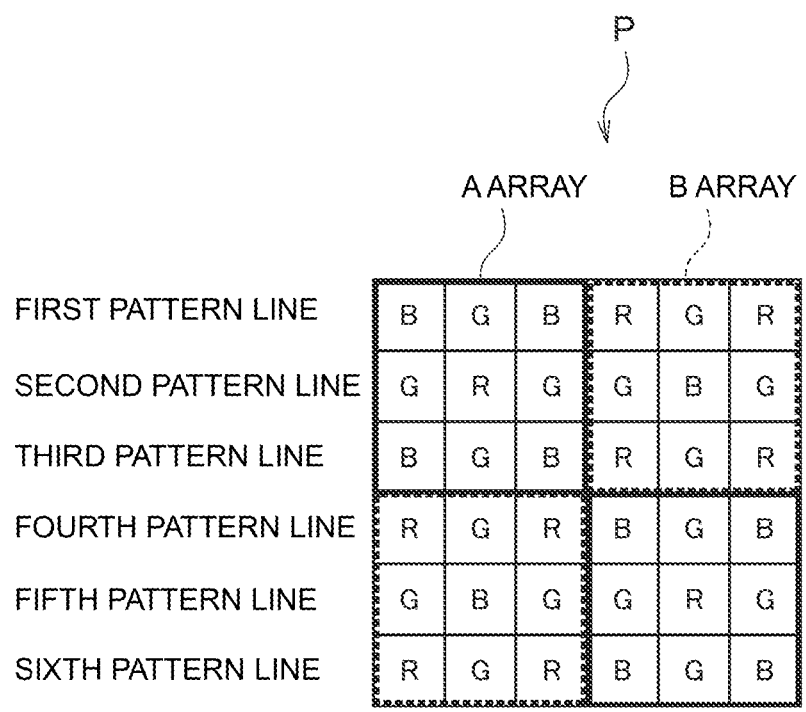

A ARRAY   B ARRAY

| B | G | B | R | G | R | B | G | B | R | G | R |
|---|---|---|---|---|---|---|---|---|---|---|---|
| G | R | G | G | B | G | G | R | G | G | B | G |
| B | G | B | R | G | R | B | G | B | R | G | R |
| R | G | R | B | G | B | R | G | R | B | G | B |
| G | B | G | G | R | G | G | B | G | G | R | G |
| R | G | R | B | G | B | R | G | R | B | G | B |
| B | G | B | R | G | R | B | G | B | R | G | R |
| G | R | G | G | B | G | G | R | G | G | B | G |
| B | G | B | R | G | R | B | G | B | R | G | R |
| R | G | R | B | G | B | R | G | R | B | G | B |
| G | B | G | G | R | G | G | B | G | G | R | G |
| R | G | R | B | G | B | R | G | R | B | G | B |

FIG.12

[3×3]ARRAY

| G | R | G | G | R | G |
|---|---|---|---|---|---|
| B | G | B | B | G | B |
| G | R | G | G | R | G |
| G | R | G | G | R | G |
| B | G | B | B | G | B |
| G | R | G | G | R | G |
| G | R | G | G | R | G |
| B | G | B | B | G | B |
| G | R | G | G | R | G |
| G | R | G | G | R | G |
| B | G | B | B | G | B |
| G | R | G | G | R | G |

FIG.14

[5×5] ARRAY

| G | B | R | B | G |
|---|---|---|---|---|
| R | G | B | G | R |
| B | R | G | R | B |
| R | G | B | G | R |
| G | B | R | B | G |
| G | B | R | B | G |
| R | G | B | G | R |
| B | R | G | R | B |
| R | G | B | G | R |
| G | B | R | B | G |

FIG.20

| R | B | G | R | B | R | E | B | R | B | G | R | B | R | E | B |
|---|---|---|---|---|---|---|---|---|---|---|---|---|---|---|---|
| G | G | G | B | E | G | R | G | G | G | B | E | G | G | R |
| B | G | G | G | R | G | G | E | B | G | G | G | R | G | G | E |
| R | G | B | R | B | E | R | B | R | G | B | R | B | E | R | B |
| B | R | E | B | R | B | G | R | B | R | E | B | R | B | G | R |
| E | G | G | R | G | G | G | B | E | G | G | R | G | G | G | B |
| R | G | G | E | B | G | G | G | R | G | G | E | B | G | G | G |
| B | E | R | B | R | G | B | R | B | E | R | B | R | G | B | R |
| R | B | G | R | B | R | E | B | R | B | G | R | B | R | E | B |
| G | G | G | B | E | G | R | G | G | G | B | E | G | G | R |
| B | G | G | G | R | G | G | E | B | G | G | G | R | G | G | E |
| R | G | B | R | B | E | R | B | R | G | B | R | B | E | R | B |
| B | R | E | B | R | B | G | R | B | R | E | B | R | B | G | R |
| E | G | G | R | G | G | G | B | E | G | G | R | G | G | G | B |
| R | G | G | E | B | G | G | G | R | G | G | E | B | G | G | G |
| B | E | R | B | R | G | B | R | B | E | R | B | R | G | B | R |

IMAGING DEVICE, METHOD FOR CONTROLLING IMAGING DEVICE, AND STORAGE MEDIUM STORING A CONTROL PROGRAM

CROSS-REFERENCE TO RELATED APPLICATIONS

This application is a continuation application of International Application No. PCT/JP2012/083975, filed Dec. 27, 2012, the disclosure of which is incorporated herein by reference in its entirety. Further, this application claims priority from Japanese Patent Application No. 2011-286691, filed Dec. 27, 2011.

BACKGROUND

1. Technical Field

The present invention relates to an imaging apparatus, and a control method and a control program for an imaging apparatus, and in particular to an imaging apparatus equipped with a color image pickup device, and a control method and control program for an imaging apparatus of the same.

2. Related Art

A primary system color Bayer array (see, for example, Patent Documents 1 to 3), this being a color array widely employed in color image pickup devices, has red (R) and blue (B) placed in sequential lines of a chessboard pattern of green (G) pixels, to which the human eye is most sensitive and that contribute most to obtaining a brightness signal.

Patent Document 1: Japanese Patent Application Laid-Open (JP-A) No. 2002-135793
Patent Document 2: Japanese Patent No. 3960965
Patent Document 3: JP-A No. 2004-266369

Technical Problem

However, in a color image pickup device that employs a conventional Bayer array, for example in cases in which thinned reading is performed in the vertical direction in order to generate image data for video use, in situations where for example one line's worth of image data has been read for each 2n lines (wherein n is a positive integer) in the vertical direction (vertical direction 1/2n thinning, even number thinning), this results in line image data being read that only contains two colors: G and R, or G and B, and so color reproduction is not possible. Therefore, in thinned reading, generally one line's worth of image data is read for each (2n+1) lines (vertical direction 1/(2n+1) thinning, odd number thinning). Moreover, in other cases in which thinned reading is performed, in order to obtain color reproduction, horizontal lines containing G and R, and horizontal lines containing G and B need to be read alternately, placing severe limitations on reading methods.

An AF (auto focus) method is known in which focusing is performed based on image contrast, and referred to as a contrast AF method. In the contrast AF method, an AF evaluation value is computed, and focusing performed, based on G pixels that contribute most to obtaining a brightness signal. The precision of focusing therefore increases with increase in the precision of the AF evaluation value. In particular, under image capture conditions of low lighting there are cases in which a high precision evaluation value with a low brightness value is not obtained, and the AF precision becomes poor, and an increase in the precision of the AF evaluation value is accordingly desired. To increase processing speed, AF contrast is generally performed based on a thinned, low resolution image used by a through-image (live view image).

However, in conventional Bayer arrays, there is a problem in that, as stated earlier, when thinned, low resolution images are generated, horizontal lines that include G and R, and horizontal lines that include G and B, must be alternately read. It is therefore difficult to obtain an AF evaluation value with good precision in image capture conditions of low lighting due to such a limitation to the read method.

SUMMARY

The present invention addresses the above problem, and an object thereof is to provide an imaging apparatus, and a control method and a control program for an imaging apparatus capable of computation of AF evaluation values of excellent precision.

Solution to Problem

In order to solve the above problem, an imaging apparatus of the present invention includes: an image pickup device including plural photoelectric conversion elements arrayed in a predetermined first direction and a second direction intersecting with the first direction; a color filter that is provided above plural pixels configured by the plural photoelectric conversion elements, the color filter having repeatedly disposed basic array patterns that each include plural array lines that each run along the second direction and include, in the second direction, at least one of each of a first filter corresponding to a first color that contributes most to obtaining a brightness signal or each of second filters respectively corresponding to 2 or more second colors other than the first color, with the plural array lines including plural matching array lines in which the second direction positions of the first filter match each other and including at least one array line that has a different array of the first filters in the second direction to that of the matching array lines; a line image data generation section that reads pixel signals of the plural pixels at a set cycle from the image pickup device, and, from the read pixel signals, generates, from out of the plural pixels, line image data of the matching array lines in the base array pattern; a pixel summing section that sums together pixels at least for pixels of the first color out of the generated line image data of the matching array lines; and a computation section that computes an evaluation value for contrast AF based on the line image data that has been pixel summed.

According to this invention, line image data line image data is generated for each of matching array lines in which the second direction positions of the first filter match each other, pixels of at least one color out of the generated line image data of the matching array lines are summed together, and a contrast AF evaluation value computed. Obtaining an AF evaluation value of high precision is enabled thereby.

Note that in cases in which there are plural sets of the matching array lines present in the basic array pattern, the line image data generation section may generate line image data for the matching array lines of the set with the greatest number of the first filter.

According to this invention, line image data of the set of the matching array lines with greatest number of the first filter is generated, and pixels are summed together at least for pixels of the first color of the generated line image data of the matching array lines and a contrast AF evaluation value computed. Obtaining an AF evaluation value of higher precision is enabled thereby.

Moreover in cases in which there are plural sets of the matching array lines present in the basic array pattern, the line image data generation section may generate line image data for all the sets of the matching array lines, and the pixel summing section may sum together pixels of the first color in the line image data for each of the sets of the matching array lines.

According to this invention, in cases in which there are plural sets of the matching array lines present, line image data for all the sets of the matching array lines are generated, and pixels of the first color in the line image data are summed together for each of the sets of the matching array lines. This thereby enables an AF evaluation value of higher precision to be obtained.

Moreover, the line image data generation section may generate line image data of matching array lines that are positioned closest to each other in the first direction.

According to this invention, line image data of matching array lines that are positioned closest to each other in the first direction are respectively generated and pixel summed, thereby obtaining an AF evaluation value with excellent precision.

Moreover, the line image data generation section may read pixel signals of the plural pixels at the set cycle from the image pickup device, and may read the pixel signals of the matching array lines in the basic array pattern, from out of the plural pixels, to generate the line image data.

Moreover, configuration may be made such that: at least one of the first filters is placed in each line in the color filter plane in the first direction, the second direction, and third directions that intersect with the first direction and the second direction; and the second filters that respectively correspond to each color of the second colors are placed such that there is at least one of each, in each line of the basic array pattern in the first direction and the second direction.

According to this invention, since the first filters corresponding to the first color that contributes most to obtaining a brightness signal are placed in each line in the color filter from the first direction line to the third direction line, an increase the reproduction precision of synchronization processing in high frequency regions is enabled. Moreover, the second filters corresponding to each of 2 or more of the second colors other than the first color are placed such that there is at least one of each in each line in the basic array pattern in the first direction and the second direction, thereby enabling a reduction in the generation of color moire (false color), and higher resolution images to be achieved.

Moreover, the color filter may include a square array corresponding to 2×2 pixels configured from the first filter.

According to this invention, which direction, out of each of the four directions, is the brightness correlation direction can be determined by determination of the minimum pixel separation based on difference values of pixel values between each of the pixels of the 4 pixels of the square array corresponding to the 2×2 pixels.

Moreover, configuration may be made such that the first color is green (G), and the second colors are red (R) and blue (B).

Moreover, configuration may be made such that: the color filter includes an R filter, a G filter, and a B filter corresponding to colors red (R), green (G) and blue (B); and the color filter is configured by a first array and a second array alternately arrayed in the first direction and the second direction, in which the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

According to this invention, if 5×5 pixels (a local region of a mosaic image) are extracted centered on the first array or the second array, 2×2 pixels of G pixels are present at the 4 corners of the 5×5 pixels. The pixel values of these 2×2 pixels of G pixels can be employed to determine the correlation direction out of 4 directions.

Moreover, configuration may be made such that: the color filter includes an R filter, a G filter, and a B filter corresponding to colors red (R), green (G) and blue (B); and the color filter is configured by a first array and a second array alternately arrayed in the first direction and the second direction, in which the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

According to this invention, if 5×5 pixels (a local region of a mosaic image) are extracted centered on the first array or the second array, there is a G pixel present in adjacent contact in the horizontal direction and the vertical direction with the central pixel (the R pixel or the B pixel) of the 5×5 pixels. The pixel values of these G pixels (a total of 8 pixels) can be employed to determine the correlation direction out of 4 directions.

Moreover, configuration may be made such that the color filter has line point symmetry about the center of the basic array pattern.

According to this invention, a reduction in the circuit scale of a processing circuit at a later stage is enabled.

An imaging apparatus of the present includes: an image pickup device including plural photoelectric conversion elements arrayed in a predetermined first direction and a second direction intersecting with the first direction; a color filter that is provided above plural pixels configured by the plural photoelectric conversion elements, the color filter having repeatedly disposed basic array patterns that each include plural array lines that each run along the second direction and include in the second direction at least one of each of a first filter corresponding to a first color that contributes most to obtaining a brightness signal or each of second filters respectively corresponding to 2 or more second colors other than the first color, with the plural array lines including at least plural first matching array lines in which the second direction positions of the first filter match each other, and plural second matching array lines that have a different array of the first filters in the second direction to that of the first matching array lines; a line image data generation section that reads pixel signals of the plural pixels at a set cycle from the image pickup device, and, from the read pixel signals, generates line image data of the matching array lines of the set with the greatest number of the first filter out of the matching array lines; and a computation section that computes an evaluation value for contrast AF based on the line image data generated by the line image data generation section.

According to this invention, evaluation values for contrast AF are computed based on the line image data of the set of matching array lines with the greatest number of the first filter. This thereby enables computing of a contrast AF evaluation value with excellent precision, without summing pixels.

A control method for the imaging apparatus of the present is a control method for an imaging apparatus equipped with an image pickup device including plural photoelectric conversion elements arrayed in a predetermined first direction and a second direction intersecting with the first direction, and a color filter that is provided above plural pixels configured by the plural photoelectric conversion elements, the color filter having repeatedly disposed basic array patterns that each include plural array lines that each run along the second direction and include in the second direction at least one of each of a first filter corresponding to a first color that contributes most to obtaining a brightness signal or each of second filters respectively corresponding to 2 or more second colors other than the first color, with the plural array lines including plural matching array lines in which the second direction positions of the first filter are the same as each other and including at least one array line that has a different array of the first filters in the second direction to that of the matching array lines. The control method including: reading pixel signals of the plural pixels at a set cycle from the image pickup device; from the read pixel signals, generating from out of the plural pixels, line image data of the matching array lines in the base array pattern; summing together pixels at least for pixels of the first color out of the generated line image data of the matching array lines; and computing an evaluation value for contrast AF based on the line image data that has been pixel summed.

A control program of the present is a control program that causes processing to be executed in a computer to control an imaging apparatus equipped with an image pickup device including plural photoelectric conversion elements arrayed in a predetermined first direction and a second direction intersecting with the first direction, and a color filter that is provided above plural pixels configured by the plural photoelectric conversion elements, the color filter having repeatedly disposed basic array patterns that each include plural array lines that each run along the second direction and include in the second direction at least one of each of a first filter corresponding to a first color that contributes most to obtaining a brightness signal or each of second filters respectively corresponding to 2 or more second colors other than the first color, with the plural array lines including plural matching array lines in which the second direction positions of the first filter match each other and including at least one array line that has a different array of the first filters in the second direction to that of the matching array lines. The processing including: a step of reading pixel signals of the plural pixels at a set cycle from the image pickup device; a step of, from the read pixel signals, generating, from out of the plural pixels, line image data of the matching array lines in the base array pattern; a step of summing together pixels at least for pixels of the first color out of the generated line image data of the matching array lines; and a step of computing an evaluation value for contrast AF based on the line image data that has been pixel summed.

A control program of the present invention is a control program that causes processing to be executed in a computer, the processing including: a step of generating line image data from pixel signals of pixel signals that have been read at a set cycle from plural pixels in an image pickup device, the image pickup device including plural photoelectric conversion elements arrayed in a predetermined first direction and a second direction intersecting with the first direction, and a color filter that is provided above plural pixels configured by the plural photoelectric conversion elements, the color filter having repeatedly disposed basic array patterns that each include plural array lines that each run along the second direction and include in the second direction at least one of each of a first filter corresponding to a first color that contributes most to obtaining a brightness signal or each of second filters respectively corresponding to 2 or more second colors other than the first color, with the plural array lines including plural matching array lines in which the second direction positions of the first filter are the same as each other and including at least one array line that has a different array of the first filters in the second direction to that of the matching array lines, and the line image data being generated for each of the matching array lines in the basic array pattern out of the plural pixels; a step of summing together pixels at least for pixels of the first color out of the generated line image data of the matching array lines; and a step of computing an evaluation value for contrast AF based on the line image data that has been pixel summed.

Advantageous Effects of Invention

The invention has an advantageous effect of enabling computation of an AF evaluation value of excellent precision.

BRIEF DESCRIPTION OF DRAWINGS

FIG. 3 is a diagram illustrating a basic array pattern contained in a color filter according to the first exemplary embodiment.

FIG. 4 is a diagram illustrating a color filter in which 6×6 pixel basic array patterns contained in a color filter according to the first exemplary embodiment are split into 3×3 pixel A arrays and B arrays, that are repeatedly disposed along a horizontal direction and a vertical direction.

FIG. 9 is a diagram illustrating a basic array pattern contained in a color filter according to the second exemplary embodiment.

FIG. 12 is a diagram of a modified example of a color filter.
FIG. 14 is a diagram of a modified example of a color filter.

FIG. 20 is a diagram of a modified example of a color filter.

DESCRIPTION OF EMBODIMENTS

Explanation follows regarding exemplary embodiments of the present invention, with reference to the drawings.

First Exemplary Embodiment

Figure 1:
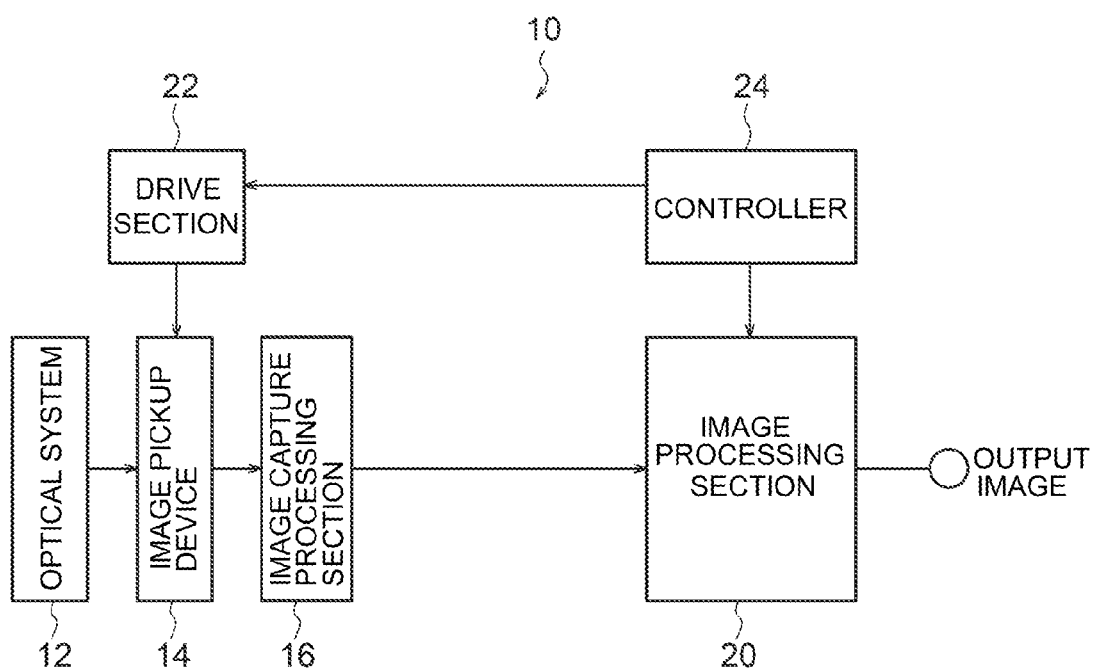
FIG. 1 is a schematic block diagram of an imaging apparatus according to a first exemplary embodiment.

FIG. 1 is a schematic block diagram illustrating an imaging apparatus 10 according to the present exemplary embodiment. The imaging apparatus 10 is configured including an optical system 12, an image pickup device 14, an image capture processing section 16, an image processing section 20, a drive section 22, and a controller 24.

The optical system 12 is configured including, for example, a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS), containing plural photoelectric conversion elements arrayed in the horizontal direction and vertical direction, with a color filter disposed above the image pickup device.

Figure 2:
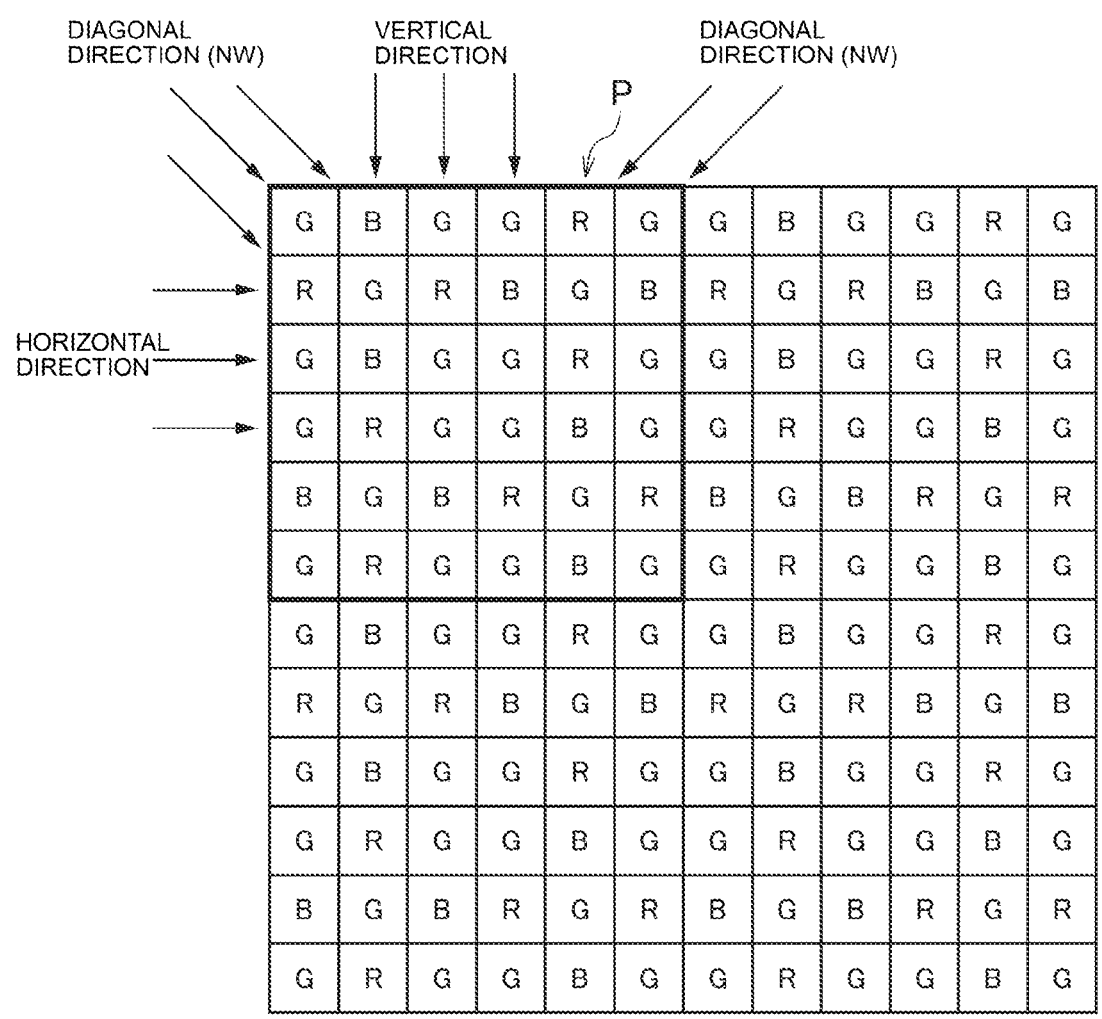
FIG. 2 is a configuration diagram of a color filter according to the first exemplary embodiment.

FIG. 2 illustrates a portion of a color filter according to the present exemplary embodiment. One out of 3 primary color filters red (R), green (G) and blue (B) is placed over each of the pixels.

Color Filter Array Features

The color filter of the first exemplary embodiment includes the following features (1) to (6).

Feature (1)

The color filter array has a repeatedly disposed basic array pattern of a predetermined pattern of (N×M) pixels (wherein N, M are integers of 3 or more) in the vertical direction and the horizontal direction of the 3 primary color filters red (R), green (G) and blue (B), wherein the green (G) filter and at least one color filter out of the red (R) or the blue (B) is placed in each of the vertical direction and the horizontal direction.

The color filter according to the present exemplary embodiment illustrated in FIG. 2 includes a basic array pattern P (the pattern indicated by the bold frame) formed from square array patterns corresponding to, as an example, 6×6 pixels (N=M=6), with the basic array pattern P disposed so as to repeat in both the vertical direction (a first direction) and the horizontal direction (a second direction). Namely, the color filter is arrayed such that the respective filters of each color R, G, B (the R filters, G filters, B filters) have a specific periodicity.

Thus arraying the R filters, G filters and B filters with a specific periodicity enables processing to be performed in a repeating pattern during, for example, synchronization processing (also referred to as demosaic processing, the same applies below) of R, G, B signals read from the color image pickup device.

Feature (2)

The color filter array illustrated in FIG. 2 has the G filter, that corresponds to the color contributing the most to obtaining a brightness signal (the color G in the present exemplary embodiment) placed in each line in the color filter array in the vertical direction that is the first direction, the horizontal direction that is the second direction, and third directions in the color filter plane that intersects with the first direction and the second direction, namely diagonal directions (NE, NW) (third directions). Note that NE means a diagonal direction toward the top right, and NW means a diagonal direction toward the bottom right. For example, for a square pixel array, the diagonal top right direction and the diagonal bottom right direction are directions at 45° with respect to the horizontal direction. However, in a rectangular pixel array, these are the directions of the pair of diagonals of a rectangle, and their angle varies according to the lengths of the long sides and the short sides.

Placing the G filters corresponding to the brightness system pixels in each of the lines in the vertical direction, horizontal direction, and diagonal directions (NE, NW) of the color filter array, enables the reproduction precision of synchronization processing to be raised in high frequency regions, irrespective of the directionality of the high frequency.

Feature (3)

In the color filter array illustrated in FIG. 2, 1 or more of each of the R filter and B filter, corresponding to the 2 or more colors other than the above color G (colors R, B in the present exemplary embodiment), is disposed in each line in the basic array pattern P in the vertical direction and horizontal direction of the color filter array.

Disposing the R filter and the B filter in each line in the vertical direction and horizontal direction of the color filter array enables generation of color moire (false color) to be reduced.

This thereby enables an optical low pass filter for suppressing false color generation to be omitted from placement on the optical path of the optical system, from the incident face to the imaging plane, or, even in cases in which an optical low pass filter is applied, one can be employed that has a weak action to cut the high frequency components to prevent false color generation, thereby enabling deterioration of resolution to be avoided.

Feature (4)

FIG. 3 illustrates a state in which the basic array pattern P illustrated in FIG. 2 has been divided into 4 sets of 3×3 pixels.

The basic array pattern P, as illustrated in FIG. 3, may be achieved by arraying an A array of the 3×3 pixels surrounded by the solid line frame, and a B array of the 3×3 pixels surrounded by the broken line frame, so as to be alternately disposed along the horizontal and vertical directions.

In both the A array and the B array, the G filters that are the brightness system pixels are placed at the 4 corners and at the center, thereby being placed over both diagonal lines. In the A array, R filters are placed on both sides of the central G filter in the horizontal direction, and B filters are placed on both sides of the central G filter in the vertical direction. However in the B array, B filters are placed on both sides of the central G filter in the horizontal direction, and R filters are placed on both sides of the central G filter in the vertical direction. Namely, the A array and the B array have reverse positional relationships for the R filters and the B filters, but have similar placement otherwise.

Due to disposing the A array and the B array alternately in the vertical direction and the horizontal direction, as illustrated in FIG. 4, the 4 corner G filters in the A array and the B array form square array G filters corresponding to 2×2 pixels.

Namely, the color filter array (basic array pattern P) illustrated in FIG. 2 includes square arrays corresponding to 2×2 pixels configured by G filters.

Figure 5:
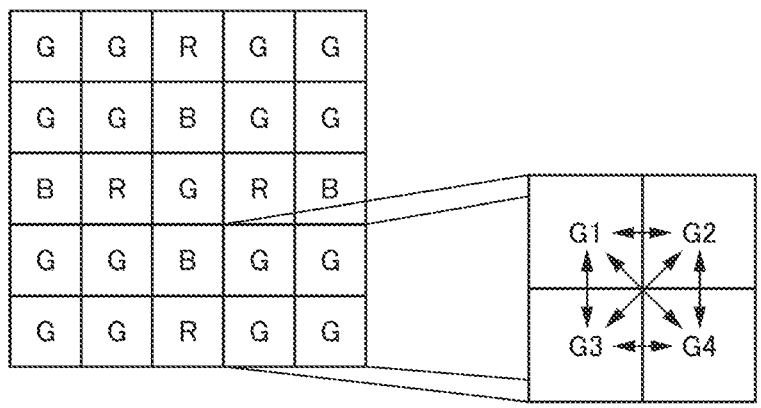
FIG. 5 is a diagram illustrating a distinctive placement of G pixels in a color filter according to the first exemplary embodiment.

When, as illustrated in FIG. 5, a 5×5 pixel local region centered on an A array is extracted from a mosaic image output from the image pickup device 14, the 2×2 pixels of G pixels at the 4 corners in the local region are disposed as illustrated in FIG. 5.

As illustrated in FIG. 5, taking the pixel values of the 2×2 pixels of G pixels as G1, G2, G3, G4 in sequence from top left to bottom right, the vertical direction difference absolute value of the pixel values of these G pixels is (|G1−G3|+|G2−G4|)/2, the difference absolute value in the horizontal direction is (|G1−G2|+|G3−G4|)/2, the difference absolute value in the diagonal direction towards the top right is |G2−G3|, and the difference absolute value in the diagonal direction towards the top left is |G1−G4|.

The correlation (correlation direction) can then be determined as the direction with the smallest difference absolute value out of these four correlation absolute values.

As illustrated in FIG. 4 or FIG. 5, when a 5×5 pixel local region is extracted from a mosaic image such that the 3×3 pixel A array is positioned at its center, there are 2×2 pixels of G pixels placed at the 4 corners thereof. Consequently, when the 3×3 pixels of the A array inside the above local region are pixels subject to synchronization processing, the sums (or the average values) of the correlation absolute values of the 4 corners are derived separately for each direction, and the direction having the smallest value out of the sums (or the average values) of the correlation absolute values for each direction is determined as the brightness correlation direction of the pixels subject to synchronization processing. The determined correlation direction may be employed when performing synchronization processing or the like.

Feature (5)

Moreover, the basic array pattern P configuring the color filter array illustrated in FIG. 2 has point symmetry about the center of the basic array pattern (the center of the 4 G filters). Moreover, as illustrated in FIG. 3, each of the A array and the B array inside the basic array pattern also respectively have point symmetry about the central G filters, and also have top-bottom and left-right symmetry (line symmetry).

This symmetry enables the circuit scale of a processing circuit at a later stage to be made smaller, and to be simplified.

Feature (6)

Figure 6:
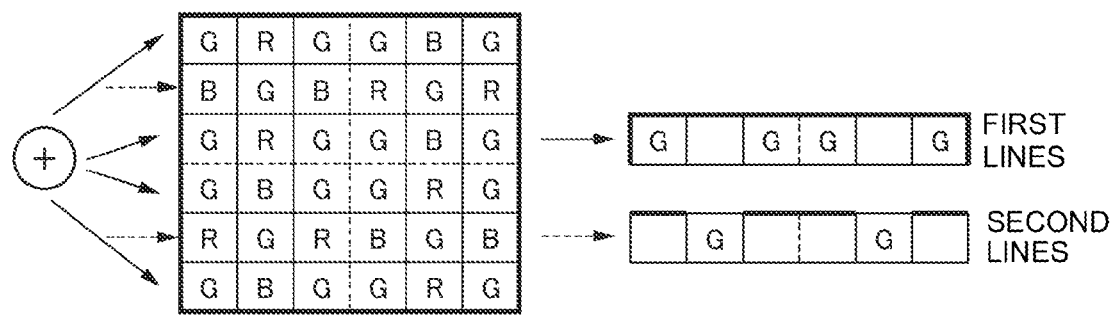
FIG. 6 is an explanatory diagram regarding pixel summing processing according to the first exemplary embodiment.

The G filter of the basic array pattern P configuring the color filter array illustrated in FIG. 2 includes plural matching array lines running along the horizontal direction with G filters at matching positions in the horizontal direction. For example, as illustrated in FIG. 6, the $1^{st}$ line, $3^{rd}$ line, $4^{th}$ line, and $6^{th}$ line in the vertical direction each have G filters in matching positions in the horizontal direction. Moreover, the $2^{nd}$ line and the $5^{th}$ line also have G filters in matching positions in the horizontal direction. Consequently, when a contrast AF method is applied as an AF method and an AF evaluation value computed based on the pixel values of G pixels, line image data of matching arrays with G filters in matching positions in the horizontal direction is read, and G pixels with matching positions in the horizontal direction are summed together. An increase in the precision of AF evaluation values is thereby enabled.

The image capture processing section 16 performs predetermined processing on image capture signals output from the image pickup device 14, such as amplification processing, correlation double sampling processing and A/D conversion processing, and then outputs these as image data to the image processing section 20.

The image processing section 20 subjects the image data output from the image capture processing section 16 to what is referred to as synchronization processing. Namely, for all the pixels, interpolation is performed of image data for colors other than the corresponding respective color from pixel data of peripheral pixels, so as to generate R, G, B pixel data for all pixels. Then, what is referred to as YC conversion processing is performed to the generated R, G, B image data, to generate brightness data Y and color difference data Cr, Cb. Resizing processing is then performed to re-size these signals to a size according to the image capture mode.

The drive section 22 drives operations such as reading of image capture signals from the image pickup device 14 according to instruction from the controller 24.

The controller 24 performs overall control, such as of the drive section 22 and the image processing section 20, according to such factors as the image capture mode. Detailed description is given later, however, briefly, the controller 24 instructs the drive section 22 to read image capture signals with a reading method according to the image capture mode, and instructs the image processing section 20 to perform image processing according to the image capture mode.

Since, depending on the image capture mode, there is a need to thin and read the image capture signals from the image pickup device 14, the controller 24 instructs the drive section 22 so as to thin with a thinning method according to the instructed image capture mode and to read the image capture signals.

As the image capture mode, there is a still image mode that captures a still image, and video modes, including an HD video mode that thins a captured image and generates High Definition (HD) video data at a comparatively high resolution and records this on a recording medium such as a memory card, not illustrated in the drawings, and a through video mode (live-view mode) in which a captured image is thinned and a through video (live-view image) of comparatively low resolution is output to a display section, not illustrated in the drawings. However, the type of image capture mode is not limited thereto.

Figure 7:
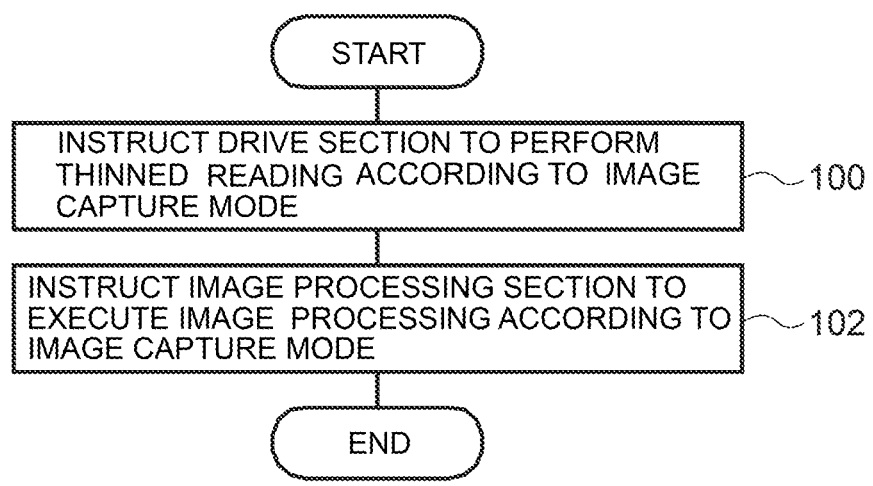
FIG. 7 is a flow chart illustrating processing executed by a control section.

Explanation next follows regarding processing executed by the controller 24 as operation of the present exemplary embodiment, with reference to the flow chart illustrated in FIG. 7.

Note that the processing illustrated in FIG. 7 is performed during still image capture by a user in which an attempt is made to focus on a subject by half pressing the shutter button (or the shutter switch), for example. The following explanation describes a case in which line image data at a predetermined position in the vertical direction is read, namely a case in which reading is performed in which lines other than lines in the predetermined position in the vertical direction are thinned (left out). The line image data in this case is a collection of pixel data of pixels in a row along the horizontal direction.

First, at step 100, the drive section 22 is instructed to read image data using a thinning method corresponding to the image capture mode.

In the present exemplary embodiment, the drive section 22 is instructed to read line image data along the horizontal direction for each of the matching array lines with G filters at matching positions along the horizontal direction of the basic array pattern P from the image pickup device 14 (in the present exemplary embodiment the drive section 22 and the controller 24 correspond to the line image data generation means).

In the case of the color filter illustrated in FIG. 6, line image data of the $1^{st}$ line, the $3^{rd}$ line, the $4^{th}$ line, and the $6^{th}$ line have G filters in matching positions along the horizontal direction in the basic array pattern P. Moreover, the line image data of the $2^{nd}$ line and the $5^{th}$ line also have G filters at matching positions in the horizontal direction. In this case, the number of G pixels in the horizontal direction of the basic array pattern P is greater in a first set, this being the line image data of the $1^{st}$ line, the $3^{rd}$ line, the $4^{th}$ line, and the $6^{th}$ line, compared to in a second set, this being the line image data of the 2nd line and the 5th line. Consequently, in the present exemplary embodiment, the drive section 22 is instructed to read line image data of the 4 lines of the first set, in which the number of G pixels is greater.

At step 102, pixel summing processing is executed that sums G pixels in the line image data of the read matching arrays with G filters in matching positions in the horizontal direction, and the image processing section 20 is instructed to execute processing that computes an AF evaluation value based on image data after pixel summing processing (in the present exemplary embodiment, the image processing section 20 and the controller 24 correspond to the pixel summing means and the computation means).

Accordingly, as illustrated in FIG. 6, line image data is generated, for each basic array pattern P, in which G pixels that having matching positions in the horizontal direction of line image data of the 1st line, the 3rd line, the 4th line, and the 6th line are summed together (first lines). Image data, based on line image data in which pixel summing has been performed for each basic array pattern P, then becomes the image data employed for the AF evaluation value computation, and a contrast AF evaluation value is computed for contrast AF based on this image data.

Accordingly, in cases in which there are plural sets present that are sets of lines have matching arrays of G pixel positions, since G pixels of line image data of the matching array lines with the greatest number of G pixels are summed together, computation of a high precision AF evaluation value is enabled.

Note that the controller 24 and the image processing section 20 may be configured by a computer including a CPU, ROM, RAM and non-volatile ROM. In such cases, the processing program for the above processing may, be pre-stored on the non-volatile ROM, and may be executed by reading by the CPU for example.

Accordingly, in the present exemplary embodiment, the color filter includes plural lines that are matching arrays with G pixels in matching positions in the horizontal direction of the basic array pattern P, and pixel summing processing is executed that sums together pixels of the same color in line image data of read matching arrays, thereby enabling computation of a high precision AF evaluation value.

Note that, as described above, in cases in which there are three or more matching array lines present in the basic array pattern P with G pixels at matching positions along the horizontal direction, G pixels in matching positions in the horizontal direction of line image data may be summed together for all matching array lines, however pixel summing may be performed for only some of the matching array lines. In this case, it is preferable to read at least line image data of each of the matching array lines positioned closest to each other in the vertical direction, and to sum together G pixels with matching positions in the horizontal direction. An image of excellent image quality is obtained thereby.

Moreover, in the above description, in cases where there are plural sets present that are sets of lines have matching arrays of G pixel positions, G pixels of line image data of the matching array lines having the most G pixels are summed together. However, as illustrated for example in FIG. 6, G pixels may be summed together in line image data of matching array lines of the 2nd line and 5th line, in which the number of G pixels is less (second lines).

Moreover, pixel summing may be performed for all sets, to sum together pixels that are C pixels of line image data of matching array lines. Namely, configuration may be made such that computation of the AF evaluation value is performed based on image data in which line image data of the first lines, in which G pixels of line image data of the first set having the greater number of G pixels have been pixel summed together, are alternately disposed in the vertical direction with line image data of the secondary lines, in which G pixels of line image data of the second set having the fewer number of G pixels have been pixel summed.

Moreover, although explanation has been given in the present exemplary embodiment of an example in which pixel values of G pixels in matching positions in the horizontal direction are simply summed, there is no limitation thereto, and weighted summing may be performed.

Moreover, there is no limitation to when capture of still images is performed, and the above processing may be executed when capturing video.

Second Exemplary Embodiment

Explanation next follows regarding a second exemplary embodiment of the present invention. Explanation is given of a modified example of a color filter in the present exemplary embodiment.

Figure 8:
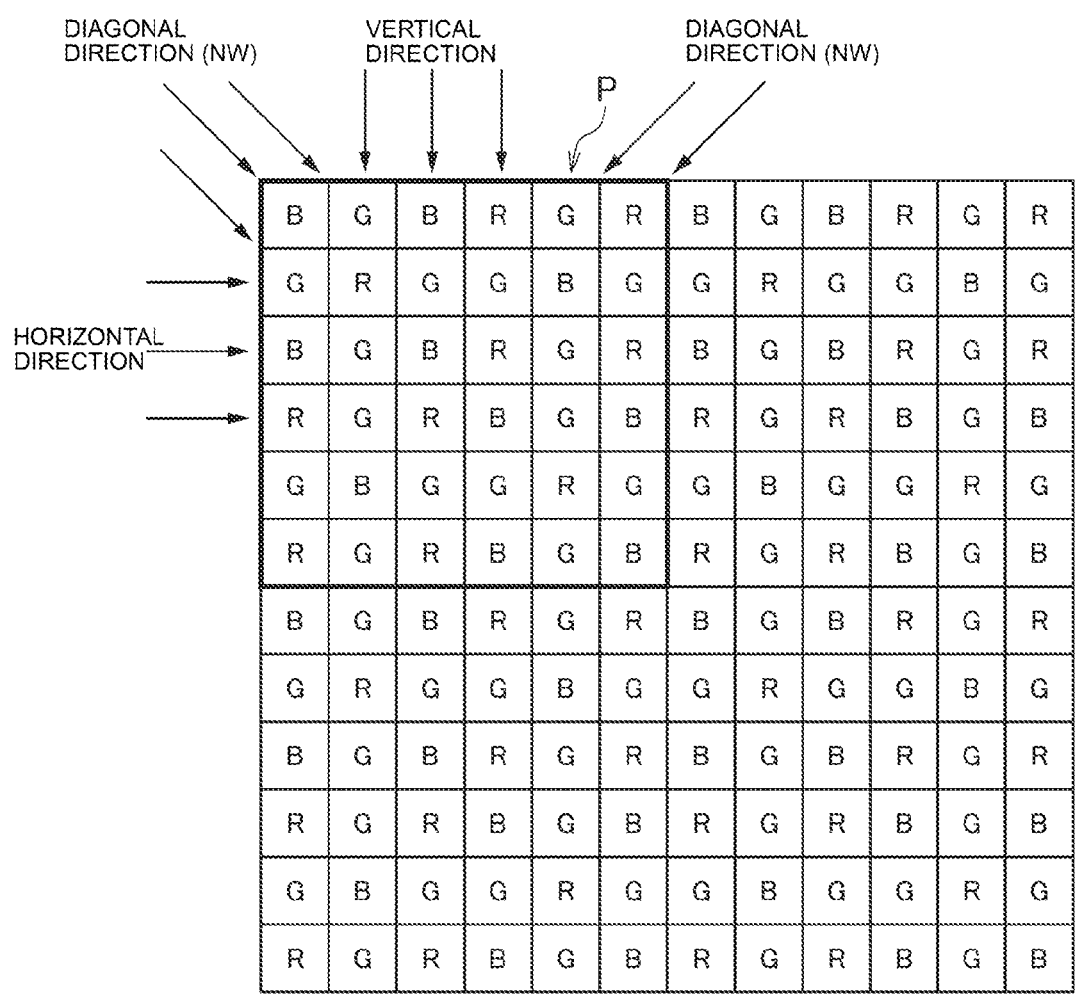
FIG. 8 is a configuration diagram of a color filter according to a second exemplary embodiment.

FIG. 8 illustrates a color filter according to the present exemplary embodiment. The color filter according to the present exemplary embodiment, as illustrated in FIG. 8, includes a basic array pattern P (the pattern indicated by the bold frame) formed from a square array pattern corresponding to 6×6 pixels, with the basic array pattern P disposed so as to repeat in both the horizontal direction and the vertical direction. Namely, the color filter array is arrayed such that the respective filters of each color R, G, B (the R filters, G filters, B filters) have a specific periodicity.

Moreover, in the color filter array illustrated in FIG. 8, the C filter is placed in each line of the color filter array in both the vertical direction and horizontal direction.

Moreover, in the color filter array illustrated in FIG. 8, one or more respectively of the R filter and the B filter is placed in the basic array pattern P in each of the lines of the color filter array in both the vertical direction and horizontal direction.

FIG. 9 illustrates a state in which the basic array pattern P illustrated in FIG. 8 has been divided into 4 sets of 3×3 pixels.

The basic array pattern P illustrated in FIG. 9 may be perceived as an A array of the 3×3 pixels surrounded by the solid line frame, and a B array of the 3×3 pixels surrounded by the broken line frame, alternately disposed along the horizontal and vertical directions.

In the A array, the R filter is placed at the center, and the B filters are placed at the 4 corners, and G filters are placed on both sides of the central R filter at the top and bottom, and left and right. However in the B array, the B filter is placed at the center, and the R filters are placed at the 4 corners, and G filters are placed on both sides of the central B filter at the top and bottom, and left and right. Namely, the A array and the B array have reverse positional relationships for the R filters and the B filters, but have similar placement otherwise.

Figures 10A, 10B:
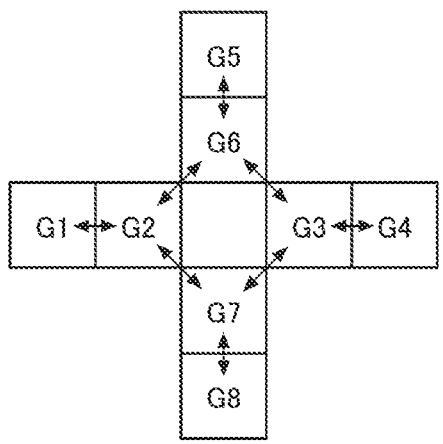
FIG. 10A is a diagram illustrating a color filter in which 6×6 pixel basic array patterns contained in a color filter according to the second exemplary embodiment are split into 3×3 pixel A arrays and B arrays that are repeatedly disposed along a horizontal direction and a vertical direction.
FIG. 10B is a diagram illustrating a distinctive placement of G pixels in a color filter according to the second exemplary embodiment.

As illustrated in FIG. 10A, the color filter of the first exemplary embodiment may be perceived as the A array and the B array, arrayed alternately in the vertical direction and the horizontal direction.

As illustrated in FIG. 10A, when a 5×5 pixel local region (a region illustrated by a bold line frame) centered on an A array is extracted from a mosaic image output from the image pickup device 14, the 8 individual G pixels within this local region are placed in a cross shape, as illustrated in FIG. 10B. The G pixels therein are denoted, in sequence from left to right, G1, G2, G3, G4, and in sequence from top to bottom, G5, G6, G7, G8. Thus the pixels G1, G2, and the pixels G3, G4 are in adjacent contact with each other in the horizontal direction, the pixels G5, G6 and the pixels G7, G8 are in adjacent contact with each other in the vertical direction, the pixels G6, G3 and the pixels G2, G7 are in adjacent contact with each other in the diagonal direction toward the top left, and the pixels G6, G2 and the pixels G3, G7 are in adjacent contact with each other in the diagonal direction toward the top right.

Thus deriving the difference absolute values of the pixel values of these adjacent pixels, enables the direction from out of each of the horizontal, vertical and diagonal directions (NE, NW) that has the smallest change in brightness (the correlation direction with the highest correlation) to be determined by the minimum pixel separation.

Namely, the sum of the difference absolute values in the horizontal direction is |G1−G2|+|G3−G4|, the sum of the difference absolute values in the vertical direction is |G5−G6|+|G7−G8|, the sum of the difference absolute values in the diagonal direction towards the top right is |G6−G2|+|G3−G7|, and the sum of the difference absolute values in the diagonal direction towards the top left is |G6−G3|+|G2−G7|.

The correlation (correlation direction) can then be determined as the direction with the smallest difference absolute value out of these four correlation absolute values. Note that the determined correlation direction can be employed during the performance of processing such as synchronization processing.

The basic array pattern P that configures the color filter illustrated in FIG. 8 has point symmetry about the center of the basic array pattern P.

As illustrated in FIG. 9, the A array and the B array in the basic array pattern each have point symmetry about a central R filter, or B filter, and are top-bottom and left-right symmetrical (have line symmetry).

Figure 11:
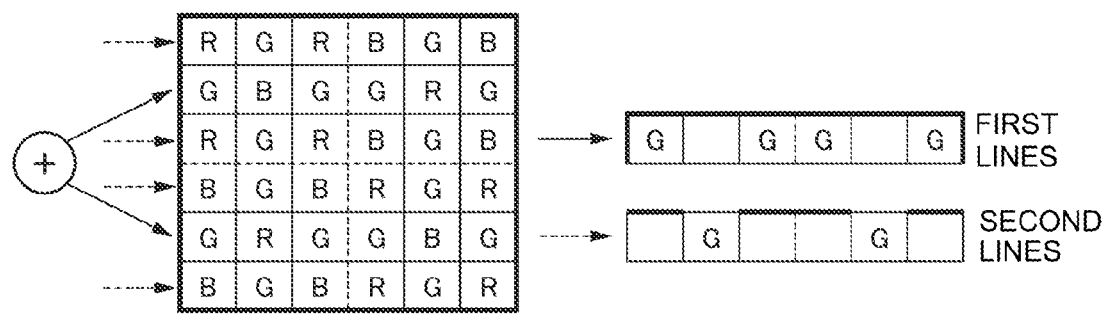
FIG. 11 is an explanatory diagram regarding pixel summing processing according to the second exemplary embodiment.

Moreover, the basic array pattern P configuring the color filter array illustrated in FIG. 8 includes plural matching array lines running along the horizontal direction with G filters at matching positions in the horizontal direction. As illustrated in FIG. 11 for example, the $1^{st}$ line, the $3^{rd}$ line, the $4^{th}$ line, and the $6^{th}$ line in the vertical direction each have G filters in matching positions in the horizontal direction. Moreover, the $2^{nd}$ line and the $5^{th}$ line also have G filters in matching positions in the horizontal direction.

Thus the color filter according to the present exemplary embodiment has characteristics that are the same as the features (1), and (3) to (6) of the color filter according to the first exemplary embodiment.

In this case, as illustrated in FIG. 11, the number of G pixels in the horizontal direction of the basic array pattern P is less in the first set, this being the line image data of the $1^{st}$ line, the $3^{rd}$ line, the $4^{th}$ line, and the $6^{th}$ line, compared to the second set, this being the line image data of the $2^{nd}$ line and the $5^{th}$ line. Consequently, in the present exemplary embodiment, at step 100 in FIG. 7, the controller 24 instructs the drive section 22 to read line image data of the two lines of the second set that has a greater number of G pixels.

Subsequently, at step 102 in FIG. 7, the controller 24 instructs the image processing section 20 to execute pixel summing processing that sums read G pixels of line image data of arrays having G filters in matching positions in the horizontal direction, and to execute processing that computes an AF evaluation value based on image data after pixel summing processing.

Accordingly, as illustrated in FIG. 11, line image data is generated for each basic array pattern P in which G pixels having matching positions in the horizontal direction of line image data of the $2^{nd}$ line, and $5^{th}$ line are summed together (first lines). Image data, based on line image data in which pixel summing has been performed for each basic array pattern P, then becomes the image data employed for the AF evaluation value computation, and a contrast AF evaluation value is computed for contrast AF based on this image data.

Accordingly, in cases in which there are plural sets of lines present that have matching arrays of G pixel positions, since G pixels of line image data of the matching array lines with the greatest number of G pixels are summed together, computation of a high precision AF evaluation value is enabled.

Note that, as illustrated in FIG. 11, configuration may be made so as to sum G pixels of line image data of the $1^{st}$ line, the $3^{rd}$ line, the $4^{th}$ line, and the $6^{th}$ line, in which the number of G pixels is less (second lines).

Moreover, configuration may be made such that, for all sets, image pixels that are G pixels of line image data of matching array lines are pixel summed together. Namely, configuration may be made such that computation of the AF evaluation value is performed based on image data in which line image data of the first lines, in which G pixels of line image data of the second set having the greater number of G pixels have been pixel summed together, are alternately disposed in the vertical direction with line image data of the secondary lines, in which G pixels of line image data of the first set having the fewer number of G pixels have been pixel summed.

Moreover, the color filter arrays are not limited to those explained in each exemplary embodiment; the present invention may also be applied to an imaging apparatus including an image pickup device with a color filter array like that described below.

A color filter array having a 3×3 pixel color filter basic array pattern P like that illustrated in FIG. 12 is an example of a color filter array having the above features (1), (2), (4), (5) and (6). This color filter array is configured by a repeating basic array pattern with the G filters placed at the center and the 4 corners out of the 3×3 pixels, and the same number each of R and B placed on the remaining 4 pixels.

Figure 13:
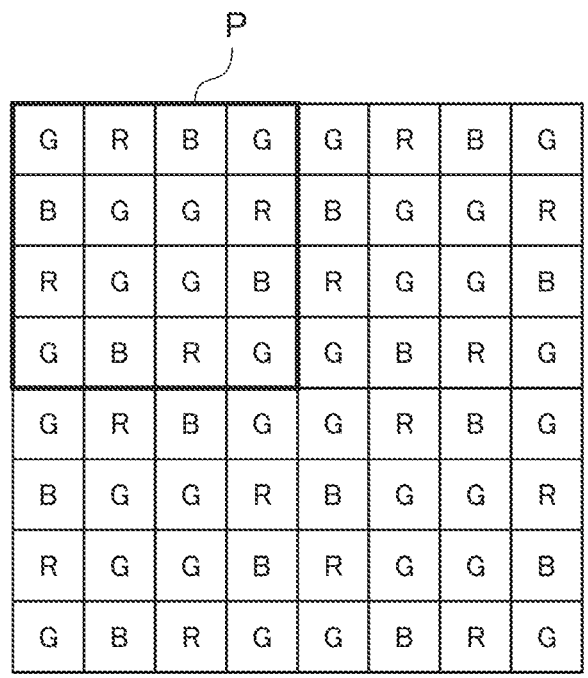
FIG. 13 is a diagram of a modified example of a color filter.

Moreover, as a color filter array having the above features (1), (3), (4), (5) and (6), there is a color filter array of 4×4 pixels of a basic array pattern P such as that illustrated in FIG. 13. This color filter array is configured by a repeating basic array pattern set with G placed along the two diagonal directions in the 4×4 pixels, and with R, B pixels placed on the remaining pixel positions such that there is 1 or more of each disposed in each of the horizontal direction and vertical direction lines in the 4×4 pixels, set such the number of G is greater than the number of R and the number of B.

Moreover, as a color filter array having the above features (1), (2), (3), (4), (5), and (6), there is, as illustrated in FIG. 14, a color filter array in which the basic array pattern P has 5×5 pixels. This color filter array is configured by a repeating basic array pattern set with G placed along the two diagonal directions in the 5×5 pixels, and with R, B pixels placed on the remaining pixel positions such that there is 1 or more of each disposed in each of the horizontal direction and vertical direction lines in the 5×5 pixels, set such the number of G is greater than the number of R and the number of B.

Figure 15:
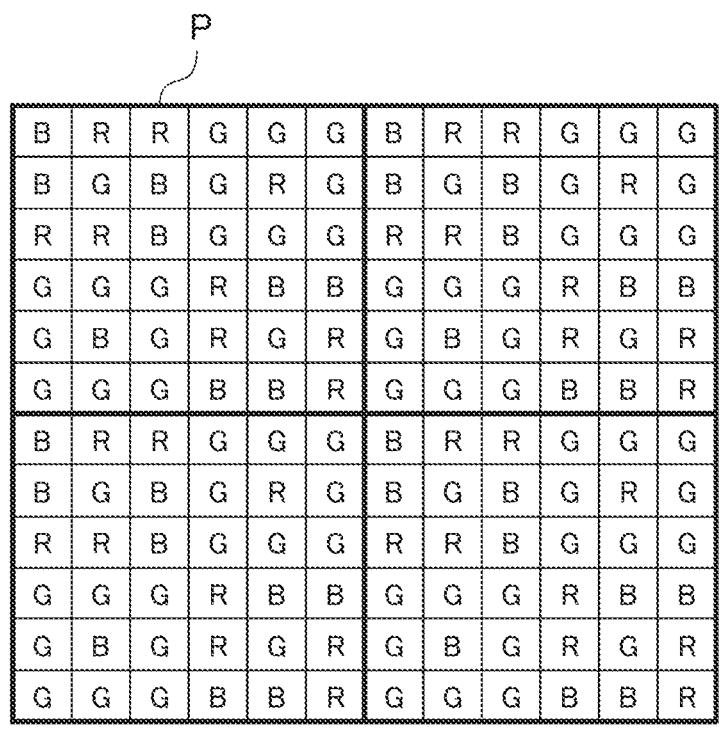
FIG. 15 is a diagram of a modified example of a color filter.

Moreover, as a color filter array having the above features (1), (2), (3), (4), (5), and (6), there is, as illustrated in FIG. 15, a color filter array in which the basic array pattern P has 6×6 pixels. This color filter array is configured by a repeating basic array pattern including a first sub array with G placed in a rectangular shape at the external perimeter of an R or B, and a second sub array in which G is placed at a center portion, with two of each of the sub arrays alternately disposed so as to be adjacent to each other along the horizontal direction and the vertical direction. Such an array is feature (3) with the additional characteristic of 1 or more of each of R and B being placed in each line in the diagonal (NE, NW) directions (third directions) of the color filter array.

Figure 16:
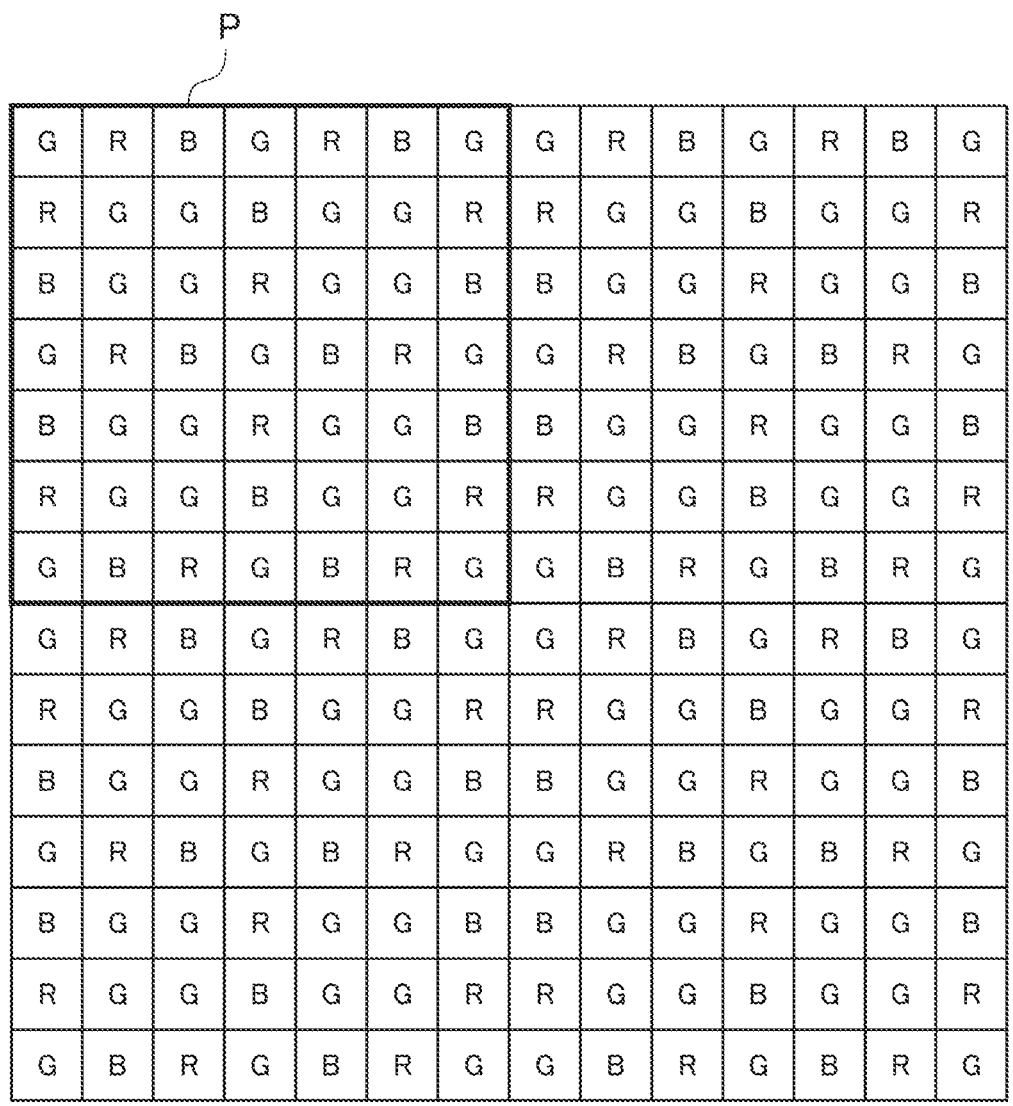
FIG. 16 is a diagram of a modified example of a color filter.
Figure 17:
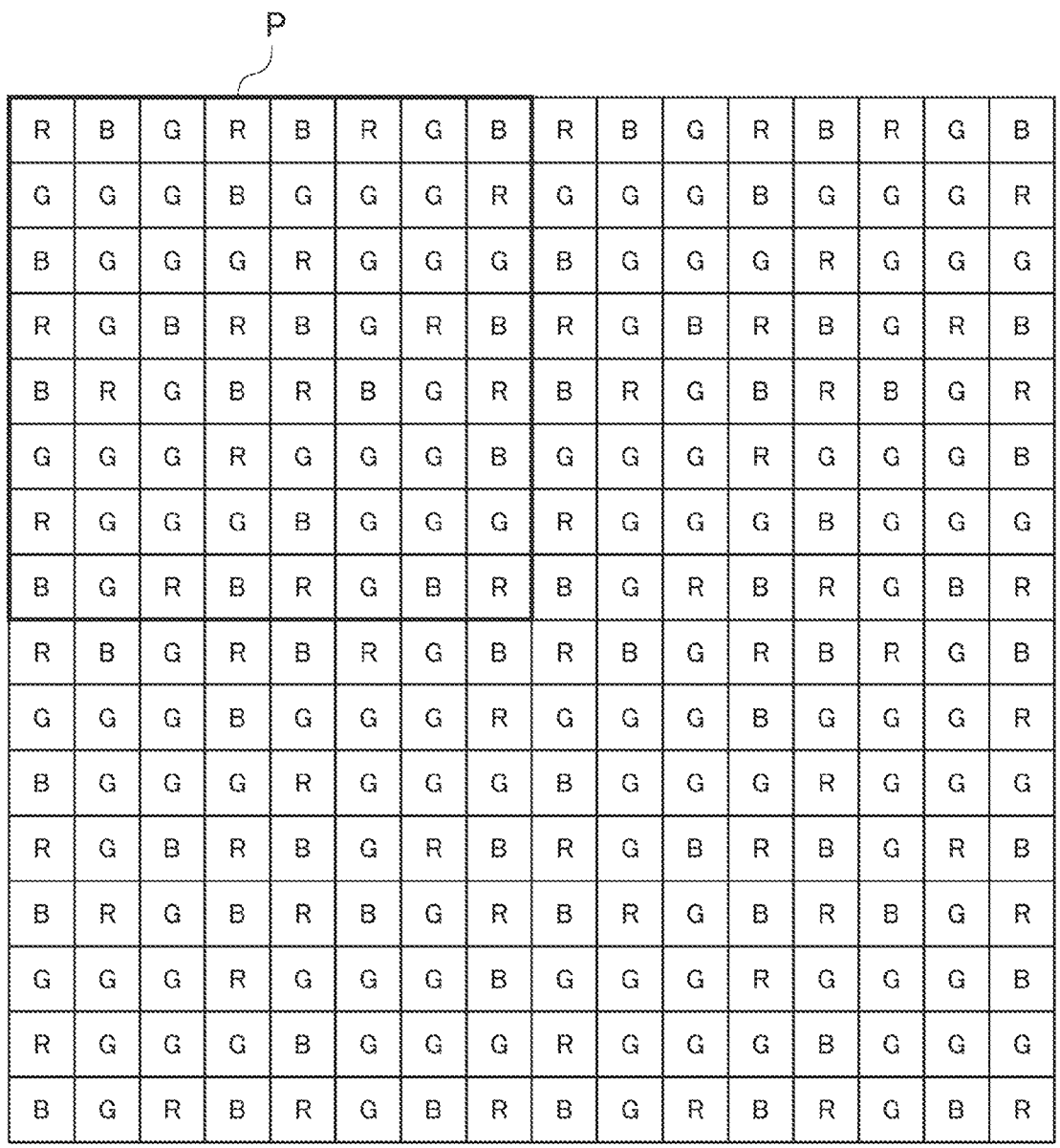
FIG. 17 is a diagram of a modified example of a color filter.

Moreover, as a color filter array having the above features (1), (2), (3), (4), (5), and (6), there is, as illustrated in FIG. 16 a color filter array in which the basic array pattern P has 7×7 pixels, and, as illustrated in FIG. 17, a color filter array in which the basic array pattern P has 8×8 pixels, and so on.

Since these color filters have the feature (6), computation of a high precision AF evaluation value is enabled by reading line image data from arrays with G pixels in matching positions in the horizontal direction, and summing G pixels.

Note that in consideration of the ease of image processing, such as synchronization processing or thinning processing during video image capture, preferably N, M are each 10 or lower.

Moreover, although explanation has been given in the above exemplary embodiment of a case in which there is a color image pickup device having 3 primary color filters, RGB, the present invention is not limited thereto, and application may be made to a color filter having 4 colors of the three primary colors RGB+one other color (for example, emerald (E)), such as for example the color filter illustrated in FIG. 20. Moreover, the present invention may be applied to a color filter having a white or transparent (W) filter as the other color. For example, a W filter may be placed instead of the emerald of FIG. 20. In such cases, a combination of W and G, or W is the first color that contributes most to the brightness signal.

Moreover, the present invention may be applied to a color image pickup device including a color filter with a complementary color system of 4 colors with, in addition to G, C (cyan), M (magenta) and Y (yellow), that are the complementary colors of the primary colors RGB.

Moreover, in each of the above exemplary embodiments, explanation has been given of cases in which line image data running along the horizontal direction are read at a predetermined cycle in the vertical direction, however the present invention is also applicable to cases in which the line image data running along the vertical direction are read at a predetermined cycled in the horizontal direction.

Moreover, in the present exemplary embodiment, a case has been explained in which lines of matching arrays with G pixels in matching positions in the horizontal direction in the basic array pattern P are read, and in which pixel summing processing is executed that sums same color pixels in line image data of read matching arrays. However, configuration may be made such that out of matching array lines in which G pixels have matching positions in the horizontal direction in the basic array pattern P, the line image data of the set of matching array lines with the most G filters is read, and the contrast AF evaluation value computed based on the read line image data, without pixel summing. This thereby enables computation of an AF contrast value with excellent precision without pixel summing.

Figure 18:
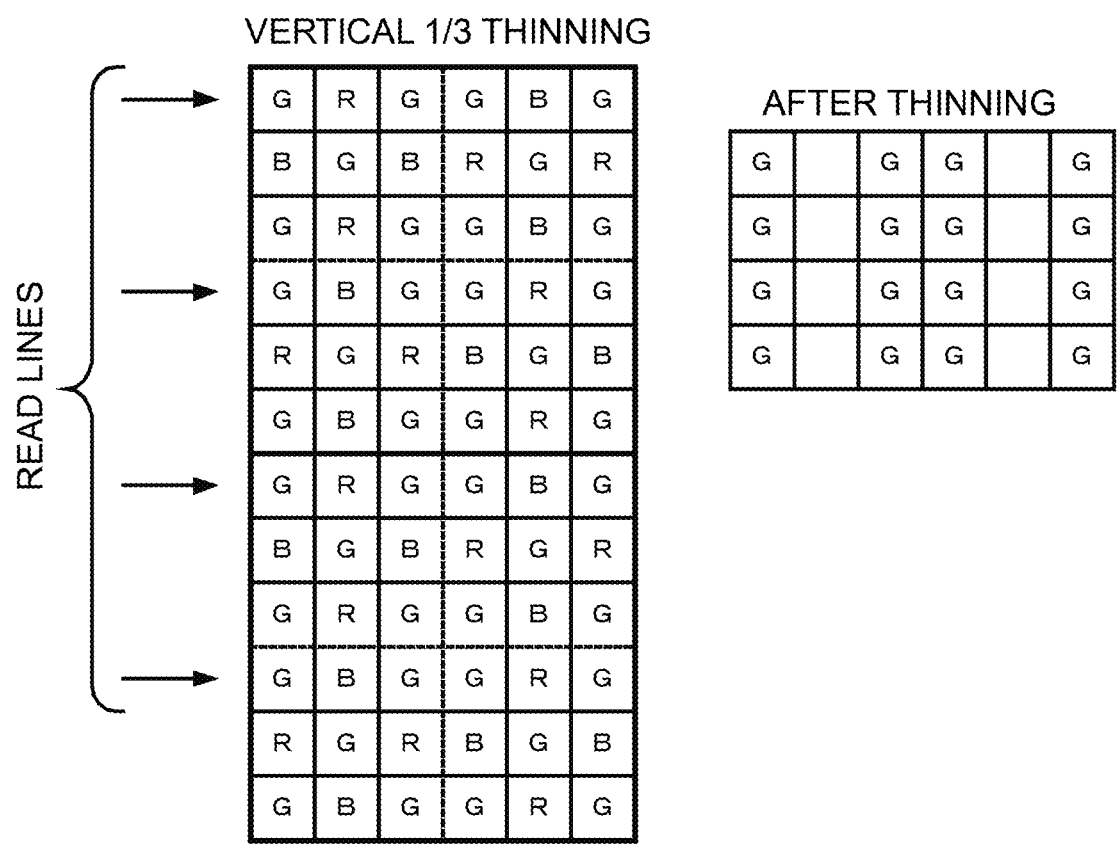
FIG. 18 is an explanatory diagram regarding a case in which lines with the most G pixels are read and an AF evaluation value is computed.

For example, as illustrated in FIG. 18, in cases in which line image date is read with vertical direction ⅓ thinning, each line read is a matching array line with the greatest number of G filters from out of matching array lines with G filters in matching positions in the horizontal direction. Consequently, computation of a contrast AF evaluation value may be performed based on this line image data, without pixel summing the line image data of these matching array lines.

Figure 19:
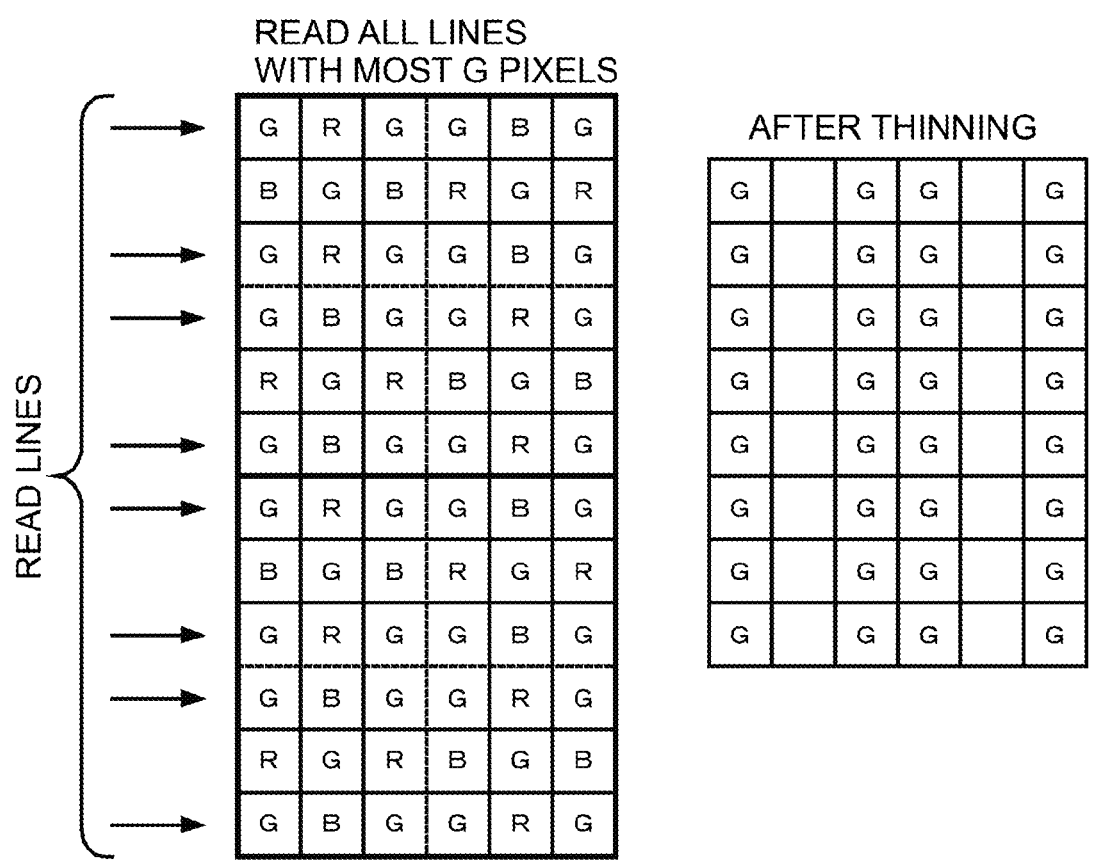
FIG. 19 is an explanatory diagram regarding a case in which lines with the most G pixels are read and an AF evaluation value is computed.

Moreover, as illustrated in FIG. 19, all line image data may be read from the set of matching arrays having the greatest number of G filters, and a contrast AF evaluation value may be computed based on these line image data without performing pixel summing on these line image data.

Moreover, in the present exemplary embodiment, explanation has been given regarding a case in which lines of matching arrays, with G pixels in matching positions in the horizontal direction in the basic array pattern P, are read from the image pickup device 14, and pixel summing processing executed that pixel sums same color pixels of line image data of read matching arrays. However, configuration may be made such that pixel signals of pixels are read for all the lines, and then line image data of matching array lines, having G pixels in matching positions in the horizontal direction in the basic array filter P, used selectively for pixel summing (with lines of other line image data not being used or stored). Moreover, configuration may be made such that pixel signals of pixels are read for all the lines and temporarily stored in memory of RAM or the like, and then line image data in the basic array pattern P of matching array lines, having G pixels in matching positions in the horizontal direction, used selectively for pixel summing (in these embodiments the image capture processing section 16 of the image processing section 20 corresponds to the line image data generation means)

Moreover, in the present exemplary embodiment, explanation has been given regarding a case in which line image data of matching array lines in the basic array pattern P are respectively read from the image pickup device 14, line image data generated, and pixel summing performed thereon. However, pixel summing may be performed in the image pickup device 14. In particular, a greater reduction in video processing time is enabled by performing pixel summing (pixel mixing) in the image pickup device 14 directly after reading (in the case of this embodiment, the image pickup device 14 and the drive section 22 correspond to the line image data generation means and the pixel summing means).

It goes without saying that the present invention is not limited by the exemplary embodiments that are described above, and various other modifications may be implemented within a range not departing from the spirit of the present invention.

What is claimed is:

1. An imaging apparatus comprising:
an image pickup device comprising a plurality of photoelectric conversion elements arrayed in a predetermined first direction and a second direction intersecting with the first direction;
a color filter that is provided above a plurality of pixels configured by the plurality of photoelectric conversion elements, the color filter having repeatedly disposed basic array patterns that each include a plurality of array lines that each run along the second direction and include, in the second direction, at least one of each of a first filter corresponding to a first color that contributes most to obtaining a brightness signal or each of second filters respectively corresponding to 2 or more second colors other than the first color, with the plurality of array lines including a plurality of matching array lines in which the second direction positions of the first filter match each other and including at least one array line that has a different array of the first filters in the second direction to that of the matching array lines, and each basic array pattern of said basic array patterns is 6×6 pixels;
a line image data generation section that reads pixel signals of the plurality of pixels at a set cycle from the image pickup device, and, from the read pixel signals, generates, from out of the plurality of pixels, line image data of the matching array lines in the base array pattern;

a pixel summing section that sums together pixels at least for pixels of the first color out of the generated line image data of the matching array lines; and an computation section that computes an evaluation value for contrast AF based on the line image data that has been pixel summed, and wherein:

the first color is green (G), and the second colors are red (R) and blue (B), and the color filter includes an R filter, a G filter, and a B filter corresponding to colors red (R), green (G) and blue (B), and the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

2. The imaging apparatus of claim 1, wherein:

in cases in which there is a plurality of sets of the matching array lines present in the basic array pattern, the line image data generation section generates line image data for the matching array lines of the set with the greatest number of the first filter.

3. The imaging apparatus of claim 1, wherein:

in cases in which there is a plurality of sets of the matching array lines present in the basic array pattern, the line image data generation section generates line image data for all the sets of the matching array lines; and the pixel summing section sums together pixels of the first color in the line image data for each of the sets of the matching array lines.

4. The imaging apparatus of claim 1, wherein the line image data generation section generates line image data of matching array lines that are positioned closest to each other in the first direction.

5. The imaging apparatus of claim 1, wherein:

the line image data generation section reads pixel signals of the plurality of pixels at the set cycle from the image pickup device, and, from out of the plurality of pixels, reads the pixel signals of the matching array lines in the basic array pattern and generates the line image data.

6. An imaging apparatus comprising:

an image pickup device comprising a plurality of photoelectric conversion elements arrayed in a predetermined first direction and a second direction intersecting with the first direction;

a color filter that is provided above a plurality of pixels configured by the plurality of photoelectric conversion elements, the color filter having repeatedly disposed basic array patterns that each include a plurality of array lines that each run along the second direction and include in the second direction at least one of each of a first filter corresponding to a first color that contributes most to obtaining a brightness signal or each of second filters respectively corresponding to 2 or more second colors other than the first color, with the plurality of array lines including at least a plurality of first matching array lines in which the second direction positions of the first filter match each other, and a plurality of second matching array lines that have a different array of the first filters in the second direction to that of the first matching array lines, and each basic array pattern of said basic array patterns is 6×6 pixels;

a line image data generation section that reads pixel signals of the plurality of pixels at a set cycle from the image pickup device, and, from the read pixel signals, generates line image data of the matching array lines out of the array lines of the set with the greatest number of the first filter; and an computation section that computes an evaluation value for contrast AF based on the line image data generated by the line image data generation section, and wherein:

the first color is green (G), and the second colors are red (R) and blue (B), and the color filter includes an R filter, a G filter, and a B filter corresponding to colors red (R), green (G) and blue (B), and the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

7. A control method for an imaging apparatus equipped with an image pickup device comprising a plurality of photoelectric conversion elements arrayed in a predetermined first direction and a second direction intersecting with the first direction, and a color filter that is provided above a plurality of pixels configured by the plurality of photoelectric conversion elements, the color filter having repeatedly disposed basic array patterns that each include a plurality of array lines that each run along the second direction and include in the second direction at least one of each of a first filter corresponding to a first color that contributes most to obtaining a brightness signal or each of second filters respectively corresponding to 2 or more second colors other than the first color, with the plurality of array lines including a plurality of matching array lines in which the second direction positions of the first filter match each other and including at least one array line that has a different array of the first filters in the second direction to that of the matching array lines, and each basic array pattern of said basic array patterns is 6×6 pixels, the control method comprising:

reading pixel signals of the plurality of pixels at a set cycle from the image pickup device;

from the read pixel signals, generating from out of the plurality of pixels, line image data of the matching array lines in the base array pattern;

summing together pixels at least for pixels of the first color out of the generated line image data of the matching array lines; and computing an evaluation value for contrast AF based on the line image data that has been pixel summed, and wherein:

the first color is green (G), and the second colors are red (R) and blue (B), and the color filter includes an R filter, a G filter, and a B filter corresponding to colors red (R), green (G) and blue (B), and the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

8. A non-transitory storage medium storing a control program that causes processing to be executed in a computer to control an imaging apparatus equipped with an image pickup device comprising a plurality of photoelectric conversion elements arrayed in a predetermined first direction and a second direction intersecting with the first direction, and a color filter that is provided above a plurality of pixels configured by the plurality of photoelectric conversion elements, the color filter having repeatedly disposed basic array patterns that each include a plurality of array lines that each run along the second direction and include in the second direction at least one of each of a first filter corresponding to a first color that contributes most to obtaining a brightness signal or each of second filters respectively corresponding to 2 or more second colors other than the first color, with the plurality of array lines including a plurality of matching array lines in which the second direction positions of the first filter match each other and including at least one array line that has a different array of the first filters in the second direction to that of the matching array lines, and each basic array pattern of said basic array patterns is 6×6 pixels, the processing comprising:
  a step of reading pixel signals of the plurality of pixels at a set cycle from the image pickup device;
  a step of, from the read pixel signals, generating from out of the plurality of pixels, line image data of the matching array lines in the base array pattern;
  a step of summing together pixels at least for pixels of the first color out of the generated line image data of the matching array lines; and
  a step of computing an evaluation value for contrast AF based on the line image data that has been pixel summed, and
  wherein:
  the first color is green (G), and the second colors are red (R) and blue (B), and
  the color filter includes an R filter, a G filter, and a B filter corresponding to colors red (R), green (G) and blue (B), and
  the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

9. A non-transitory storage medium storing a control program that causes processing to be executed in a computer, the processing comprising:
  a step of generating line image data from pixel signals of pixel signals that have been read at a set cycle from a plurality of pixels in an image pickup device, the image pickup device comprising a plurality of photoelectric conversion elements arrayed in a predetermined first direction and a second direction intersecting with the first direction, and a color filter that is provided above a plurality of pixels configured by the plurality of photoelectric conversion elements, the color filter having repeatedly disposed basic array patterns that each include a plurality of array lines that each run along the second direction and include in the second direction at least one of each of a first filter corresponding to a first color that contributes most to obtaining a brightness signal or each of second filters respectively corresponding to 2 or more second colors other than the first color, with the plurality of array lines including a plurality of matching array lines in which the second direction positions of the first filter match each other and including at least one array line that has a different array of the first filters in the second direction to that of the matching array lines, and each basic array pattern of said basic array patterns is 6×6 pixels, and the line image data being generated for each of the matching array lines in the basic array pattern out of the plurality of pixels;
  a step of summing together pixels at least for pixels of the first color out of the generated line image data of the matching array lines; and
  a step of computing an evaluation value for contrast AF based on the line image data that has been pixel summed, and
  wherein:
  the first color is green (G), and the second colors are red (R) and blue (B), and
  the color filter includes an R filter, a G filter, and a B filter corresponding to colors red (R), green (G) and blue (B), and
  the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners the R filter placed at the top and bottom of the central G filter, and the B filter placed at the left and right of the central G filter.

10. An imaging apparatus comprising:
  an image pickup device comprising a plurality of photoelectric conversion elements arrayed in a predetermined first direction and a second direction intersecting with the first direction;
  a color filter that is provided above a plurality of pixels configured by the plurality of photoelectric conversion elements, the color filter having repeatedly disposed basic array patterns that each include a plurality of array lines that each run along the second direction and include, in the second direction, at least one of each of a first filter corresponding to a first color that contributes most to obtaining a brightness signal or each of second filters respectively corresponding to 2 or more second colors other than the first color, with the plurality of array lines including a plurality of matching array lines in which the second direction positions of the first filter match each other and including at least one array line that has a different array of the first filters in the second direction to that of the matching array lines, and each basic array pattern of said basic array patterns is 6×6 pixels;
  a line image data generation section that reads pixel signals of the plurality of pixels at a set cycle from the image pickup device, and, from the read pixel signals, generates, from out of the plurality of pixels, line image data of the matching array lines in the base array pattern;

a pixel summing section that sums together pixels at least for pixels of the first color out of the generated line image data of the matching array lines; and an computation section that computes an evaluation value for contrast AF based on the line image data that has been pixel summed, and wherein:

the first color is green (G), and the second colors are red (R) and blue (B), and the color filter includes an R filter, a G filter, and a B filter corresponding to colors red (R), green (G) and blue (B), and the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

11. The imaging apparatus of claim 10, wherein:

in cases in which there is a plurality of sets of the matching array lines present in the basic array pattern, the line image data generation section generates line image data for the matching array lines of the set with the greatest number of the first filter.

12. The imaging apparatus of claim 10, wherein:

in cases in which there is a plurality of sets of the matching array lines present in the basic array pattern, the line image data generation section generates line image data for all the sets of the matching array lines; and the pixel summing section sums together pixels of the first color in the line image data for each of the sets of the matching array lines.

13. The imaging apparatus of claim 10, wherein the line image data generation section generates line image data of matching array lines that are positioned closest to each other in the first direction.

14. The imaging apparatus of claim 10, wherein:

the line image data generation section reads pixel signals of the plurality of pixels at the set cycle from the image pickup device, and, from out of the plurality of pixels, reads the pixel signals of the matching array lines in the basic array pattern and generates the line image data.

15. An imaging apparatus comprising:

an image pickup device comprising a plurality of photoelectric conversion elements arrayed in a predetermined first direction and a second direction intersecting with the first direction;

a color filter that is provided above a plurality of pixels configured by the plurality of photoelectric conversion elements, the color filter having repeatedly disposed basic array patterns that each include a plurality of array lines that each run along the second direction and include in the second direction at least one of each of a first filter corresponding to a first color that contributes most to obtaining a brightness signal or each of second filters respectively corresponding to 2 or more second colors other than the first color, with the plurality of array lines including at least a plurality of first matching array lines in which the second direction positions of the first filter match each other, and a plurality of second matching array lines that have a different array of the first filters in the second direction to that of the first matching array lines, and each basic array pattern of said basic array patterns is 6×6 pixels;

a line image data generation section that reads pixel signals of the plurality of pixels at a set cycle from the image pickup device, and, from the read pixel signals, generates line image data of the matching array lines out of the array lines of the set with the greatest number of the first filter; and an computation section that computes an evaluation value for contrast AF based on the line image data generated by the line image data generation section, and wherein:

the first color is green (G), and the second colors are red (R) and blue (B), and the color filter includes an R filter, a G filter, and a B filter corresponding to colors red (R), green (G) and blue (B); and the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

16. A control method for an imaging apparatus equipped with an image pickup device comprising a plurality of photoelectric conversion elements arrayed in a predetermined first direction and a second direction intersecting with the first direction, and a color filter that is provided above a plurality of pixels configured by the plurality of photoelectric conversion elements, the color filter having repeatedly disposed basic array patterns that each include a plurality of array lines that each run along the second direction and include in the second direction at least one of each of a first filter corresponding to a first color that contributes most to obtaining a brightness signal or each of second filters respectively corresponding to 2 or more second colors other than the first color, with the plurality of array lines including a plurality of matching array lines in which the second direction positions of the first filter match each other and including at least one array line that has a different array of the first filters in the second direction to that of the matching array lines, and each basic array pattern of said basic array patterns is 6×6 pixels, the control method comprising:

reading pixel signals of the plurality of pixels at a set cycle from the image pickup device;

from the read pixel signals, generating from out of the plurality of pixels, line image data of the matching array lines in the base array pattern;

summing together pixels at least for pixels of the first color out of the generated line image data of the matching array lines; and computing an evaluation value for contrast AF based on the line image data that has been pixel summed, wherein:

the first color is green (G), and the second colors are red (R) and blue (B), and the color filter includes an R filter, a G filter, and a B filter corresponding to colors red (R), green (G) and blue (B), and the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

17. A non-transitory storage medium storing a control program that causes processing to be executed in a computer to control an imaging apparatus equipped with an image pickup device comprising a plurality of photoelectric conversion elements arrayed in a predetermined first direction and a second direction intersecting with the first direction, and a color filter that is provided above a plurality of pixels configured by the plurality of photoelectric conversion elements, the color filter having repeatedly disposed basic array patterns that each include a plurality of array lines that each run along the second direction and include in the second direction at least one of each of a first filter corresponding to a first color that contributes most to obtaining a brightness signal or each of second filters respectively corresponding to 2 or more second colors other than the first color, with the plurality of array lines including a plurality of matching array lines in which the second direction positions of the first filter match each other and including at least one array line that has a different array of the first filters in the second direction to that of the matching array lines, and each basic array pattern of said basic array patterns is 6×6 pixels, the processing comprising:

a step of reading pixel signals of the plurality of pixels at a set cycle from the image pickup device;

a step of, from the read pixel signals, generating from out of the plurality of pixels, line image data of the matching array lines in the base array pattern;

a step of summing together pixels at least for pixels of the first color out of the generated line image data of the matching array lines; and a step of computing an evaluation value for contrast AF based on the line image data that has been pixel summed, wherein:

the first color is green (G), and the second colors are red (R) and blue (B), and the color filter includes an R filter, a G filter, and a B filter corresponding to colors red (R), green (G) and blue (B), and the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

18. A non-transitory storage medium storing a control program that causes processing to be executed in a computer, the processing comprising:

a step of generating line image data from pixel signals of pixel signals that have been read at a set cycle from a plurality of pixels in an image pickup device, the image pickup device comprising a plurality of photoelectric conversion elements arrayed in a predetermined first direction and a second direction intersecting with the first direction, and a color filter that is provided above a plurality of pixels configured by the plurality of photoelectric conversion elements, the color filter having repeatedly disposed basic array patterns that each include a plurality of array lines that each run along the second direction and include in the second direction at least one of each of a first filter corresponding to a first color that contributes most to obtaining a brightness signal or each of second filters respectively corresponding to 2 or more second colors other than the first color, with the plurality of array lines including a plurality of matching array lines in which the second direction positions of the first filter match each other and including at least one array line that has a different array of the first filters in the second direction to that of the matching array lines, and each basic array pattern of said basic array patterns is 6×6 pixels, and the line image data being generated for each of the matching array lines in the basic array pattern out of the plurality of pixels;

a step of summing together pixels at least for pixels of the first color out of the generated line image data of the matching array lines; and a step of computing an evaluation value for contrast AF based on the line image data that has been pixel summed, wherein:

the first color is green (G), and the second colors are red (R) and blue (B), and the color filter includes an R filter, a G filter, and a B filter corresponding to colors red (R), green (G) and blue (B), and the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

* * * * *